United States Patent [19]

Hinn

[11] Patent Number: 4,642,690
[45] Date of Patent: Feb. 10, 1987

[54] DIGITAL VIDEO SIGNAL PROCESSOR WITH ANALOG LEVEL CONTROL

[75] Inventor: Werner Hinn, Zollikerberg, Switzerland

[73] Assignee: RCA Corporation, Princeton, N.J.

[21] Appl. No.: 644,400

[22] Filed: Aug. 27, 1984

[51] Int. Cl.⁴ .......................... H04N 5/16; H04N 5/59
[52] U.S. Cl. .................................... 358/169; 358/168; 358/170; 358/171; 358/174; 358/243
[58] Field of Search ............... 358/243, 242, 166, 168, 358/169, 170, 174, 171, 176, 178, 148

[56] References Cited

U.S. PATENT DOCUMENTS

| 3,240,875 | 3/1966 | Thomas | 358/168 |
| 3,398,236 | 8/1968 | Kratochvil | 358/168 |
| 4,354,202 | 10/1982 | Harlan | 358/183 |
| 4,380,777 | 4/1983 | Miyao | 358/178 |
| 4,502,073 | 2/1985 | Hinn | 358/243 |
| 4,506,292 | 3/1985 | Newton | 358/169 |
| 4,523,233 | 6/1985 | Tallant, II | 358/242 |
| 4,535,357 | 8/1985 | Penney | 358/148 |

OTHER PUBLICATIONS

Selected pages from a technical bulletin of the Semiconductor Division of ITT Corporation, titled "DIGIT 2000VLSI Digital TV System".

Primary Examiner—Tommy P. Chin
Attorney, Agent, or Firm—P. J. Rasmussen; P. M. Emanuel; R. H. Kurdyla

[57] ABSTRACT

In a video signal processing and display system such as a television receiver employing digital video signal processing techniques, viewer generated control signals for normally controlling the brightness and/or contrast of a displayed image are utilized in analog rather than digital form for controlling the magnitude of the video signal.

9 Claims, 4 Drawing Figures

DIGITAL VIDEO SIGNAL PROCESSOR WITH ANALOG LEVEL CONTROL

This invention concerns apparatus for controlling the peak-to-peak amplitude and DC level of a video signal in a system employing digital video signal processing techniques.

A digital television signal processing system introduced by the Worldwide Semiconductor Group (Freiburg, West Germany) of International Telephone and Telegraph Corporation is described in an ITT Corporation publication titled "VLSI Digital TV System - DIGIT 2000." In that system color video signals, after being processed in digital (binary) form, are converted to analog form by means of output digital-to-analog signal converters before being coupled to an image displaying kinescope. The analog color video signals are coupled to the kinescope via analog buffer amplifiers and video output kinescope driver amplifiers which provide video output signals at a high level suitable for driving intensity control electrodes of the kinescope.

In such digital television system, viewer generated control signals for normally controlling the brightness and contrast of an image displayed by the kinescope are processed in digital form by digital video signal processing circuits which precede the output digital-to-analog signal converters. It is herein recognized that digital processing of the brightness and contrast control signals by the digital video signal processor may be undesirable in some systems. Digital processing of the brightness and contrast control signals requires that a significant portion of the video signal processing dynamic range be reserved to accomodate the brightness and contrast control range, whereby the dynamic range available for optimum amplitude resolution of the video signal is reduced. The digital bit processing capability of the digital video signal processor can be increased to provide the dynamic range desired for video signal processor, but this option involves additional circuit complexity and cost (e.g., 9-bit rather than 8-bit digital-to-analog converters may be required).

Accordingly, there is disclosed herein a video signal processing system employing digital video signal processing techniques wherein in accordance with the principles of the present invention, viewer generated control signals for normally controlling the brightness or contrast of a displayed image are utilized in analog form, exclusive of the digital signal processor, for controlling the magnitude of the video signal.

In a disclosed implementation of the invention, the analog control signals are applied to a video output kinescope driver stage for controlling the magnitude of the video signal processed by the driver stage. In a disclosed embodiment of the invention the driver stage comprises a video signal digital-to-analog converter which is advantageously capable of directly driving an intensity control electrode of the kinescope.

Figure 1:
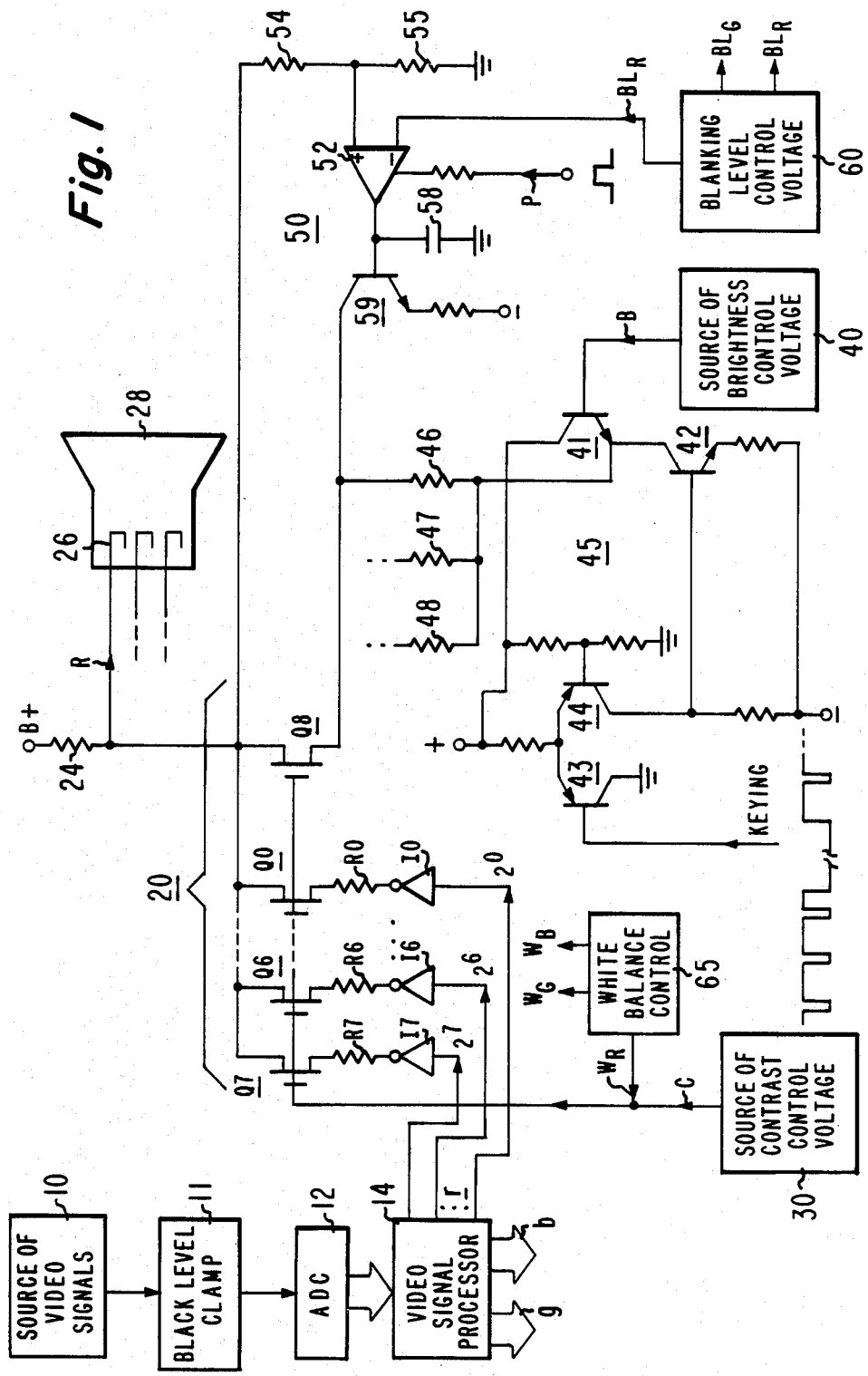
FIG. 1 shows a portion of a digital television receiver employing a brightness and contrast control arrangement in accordance with the present invention.

In FIG. 1, analog color television video signals from a source 10 are clamped by means of a black level clamp 11 before being applied to an analog-to-digital converter (ADC) 12. Clamp 11 operates during periodic image blanking intervals, such as the so-called "back porch" interval of each horizontal image blanking interval when video image information is absent. The clamped video signal applied to ADC 12 exhibits a predetermined black level as a result of the clamping action, and is converted to digital (binary) form by means of ADC 12. Digital signals from ADC 12 are processed by a digital video signal processor 14 including luminance and chrominance signal processing networks and a network for combining processed luminance and chrominance signals to produce plural digital output color image representative signals r, g and b. In this example the r, g and b signals are represented by an 8-bit digital signal in binary form ($2^0 \ldots 2^7$) and are respectively applied to binary inputs of digital-to-analog converter/driver stages, only one of which is shown and labeled as stage 20 to which the r color signal is applied. A high level analog video output signal R from digital-to-analog converter (DAC) stage 20 appears across a load impedance 24 with a magnitude suitable for directly driving a cathode intensity control electrode 26 of an image displaying kinescope 28 such as may be found in a television receiver, video monitor or other similar video processing and display system. Suitable low pass filtering of the output signal from DAC 20 is provided by means of load resistor 24 and the capacitance associated with the kinescope cathode.

DAC 20 includes a plurality of input inverters I0–I7 which act as switches and which respectively receive input digital signal bits $2^0 \ldots 2^7$. Inverters I0–I7 may, for example, include bipolar transistors operated as on-off switches. Output signals from inverters I0–I7, as developed in accordance with the logic state of binary input signals $2^0 \ldots 2^7$, are coupled via binary weighted, current determining resistors R0–R7 to an array of high voltage output MOS FET transistor devices Q0–Q7. Devices Q0–Q7 have gate electrodes connected in common as will be discussed, output drain electrodes connected in common to load impedance 24, and separate input source electrodes which respectively receive binary weighted signal currents via resistors R0–R7.

Output devices Q0–Q7 preferably are enhancement mode VMOS (Vertical MOS) FET transistor devices such as the BS 107 device type available from ITT of Freiburg, West Germany, or the BSS 93 device type available from Siemens of Munich, West Germany. VMOS devices Q0–Q7 have drain and source electrodes arranged along a vertical axis (in contrast to lateral devices which have gate, source and drain elements on the same surface). Devices Q0–Q7 can be readily constructed on a common integrated circuit substrate, preferably together with resistors R0–R7 and switching inverters I0–I7. The vertical structure of the VMOS output devices faciliates the fabrication of these devices with a high breakdown voltage rating, allowing the devices to directly drive high voltage cathode electrode 6 of kinescope 28. Converter/driver stage 20 can be arranged as described in my concurrently filed U.S. patent application Ser. No. 644,397 titled "Digital-To-Analog-Converter", and as described in my concurrently filed U.S. patent application Ser. No. 644,398 titled "Kinescope Driver In A Digital Video Signal Processing System."

Viewer generated analog control signals B and C for normally controlling the brightness and contrast, respectively, of a displayed image are provided by control signal sources 40 and 30, respectively, which may each comprise, for example, a viewer adjustable potentiometer or a microprocessor and digital-to-analog converter for developing variable magnitude analog control signals. These signals are coupled to driver stage 20 and are utilized in analog rather than digital form for controlling image contrast and brightness via the analog signal coupling path to the kinescope. Analog processing of the brightness and contrast control signals advantageously does not require that a significant portion of the dynamic range of digital video signal processor 14 be used to accommodate the brightness and contrast control ranges, which would otherwise compromise the amplitude resolution of the digitally processed video signal, unless digital circuits with greater bit processing capability (e.g., 9 bits rather than 8 bits) are used. The use of the latter circuits, however, undesirably increases the complexity and cost of the digital signal processing circuits.

The analog brightness control circuit comprises a keyed circuit 45 including transistors 41–44, and operates as follows.

A KEYING signal corresponding to a version of a composite image blanking signal, including both horizontal and vertical blanking pulse components, is applied to a voltage translating circuit including emitter coupled transistors 43 and 44. Positive amplitude portions of the KEYING signal occur during image trace intervals, while negative amplitude portions of the KEYING signal occur during horizontal and vertical image blanking intervals. The KEYING signal renders current source transistor 42 conductive via transistors 43 and 44 during each horizontal image (trace) line interval. A resulting voltage developed at the emitter of transistor 41 is approximately 0.7 volts (the base-emitter junction voltage drop of transistor 41) less than the level of brightness control voltage B which is coupled to the base input of transistor 41. The brightness control voltage from the emitter of transistor 41 is conveyed via a resistor 46 to the source electrode of another VMOS FET transistor Q8 which has its drain-source conduction path coupled to load resistor 24 and the red cathode signal coupling path at the output of red video signal driver 20. Resistors 47 and 48 similarly couple the brightness control voltage to the green and blue cathode signal coupling paths.

The current flowing through resistor 46 and transistor Q8 in response to the brightness control voltage modifies the DC level of the video signal voltage developed across output resistor 24 in accordance with the level of the brightness control voltage. The currents conducted by resistors 46, 47 and 48 during image trace intervals are related to both the brightness control voltage at the base of transistor 41, and to the magnitude of contrast control voltage C applied to the interconnected gate electrodes of driver transistors Q0–Q8 as will be discussed subsequently. The current provided by current source transistor 42 is chosen to be larger than the maximum expected sum of currents conducted by resistors 46, 47 and 48 to assure that transistor 41 remains conductive when current source transistor 42 conducts.

The system of FIG. 1 also includes an output DC bias stabilization network 50 used in combination with converter/driver stage 20. The DC stabilization network compensates for variations of the B+ operating supply voltage for the driver stage and for vertical rate ripple in the B+ supply, among other sources of B+ variation, and eliminates the need for a stabilized B+ operating supply voltage.

DC stabilization network 50 includes an operational transconductance amplifier 52 which is keyed to conduct during each horizontal image blanking interval in response to a sampling pulse P which encompasses the so-called "back porch" portion of each horizontal blanking interval, for example. When keyed to conduct, amplifier 52 compares an input blanking level control reference voltage $BL_R$ from a source 60 with an input voltage which is derived from the junction of voltage divider resistors 54 and 55 and which is representative of the output bias of the driver stage since during blanking intervals the latter voltage is related to the magnitude of the DC output level of the driver stage when video signal modulation is absent. Resistors 54 and 55 are coupled between a point of reference potential (ground) and the kinescope cathode signal path at the junction of output resistor 24 and the interconnected drain electrodes of driver transistors Q0–Q7. An error signal related to the difference in magnitude between the inputs to amplifier 52 is stored by a capacitor 58 and modulates the conduction of a transistor 59, which in turn modulates the current conduction of transistor Q8 such that the current in output resistor 24 is caused to vary with a sense for reducing the difference between the levels of the input voltages of amplifier 52 to a minimum, thereby stabilizing the horizontal DC blanking level at the output of the driver stage. Thus by feedback action stabilization network 50 maintains the input voltages of amplifier 52 at substantially equal levels, which corresponds to a desired substantially constant quiescent DC bias level at the output of the driver stage.

Blanking level control voltage $BL_R$ for the red signal channel can be developed by means of a manually preset potentiometer, or by means of a microprocessor and digital-to-analog converter in an automatic control system for example. Blanking level control voltages $BL_G$ and $BL_B$ are similarly developed and utilized with respect to the green and blue cathode signal paths. The blanking level of the video signal closely approximates the black level of the video signal. Since brightness control voltage B from source 40 is decoupled from the cathode signal path during video signal blanking intervals (when current source 42 is rendered non-conductive by the KEYING signal), the output blanking level in the cathode signal path is representative of video signal black level independent of the image brightness content as set by the viewer. This permits the kinescope cathode to exhibit a reference black level bias condition during blanking intervals when, for example, the kinescope cathode bias may be monitored and controlled for maintaining a desired level of cathode bias such as by means of an automatic kinescope bias control system, various types of which are known. In a manual kinescope bias control system, resistor 55 can be an adjustable device which is pre-set such that a desired level of kinescope cathode bias is established via the action of feedback stabilization network 50.

Contrast control of a displayed image is produced in response to gain control voltage C, which is applied to the interconnected common gate electrodes of output devices Q0-Q7 for varying the signal gain of these devices, and thereby varying the peak-to-peak amplitude of the video signal components processed by these devices. The common gate electrode of driver stage 20 exhibits a high impedance which advantageously permits a fast response to contrast control signal C, and exhibits good gain control linearity.

A white balance control network 65 also provides a gain control output voltage $W_R$ to the commonly interconnected gate electrodes of output devices Q0-Q7. White balance control voltages $W_G$ and $W_B$ are similarly coupled to driver stages associated with the green and blue signal channels. The white balance control voltages, which may be derived by means of an automatic white balance sensing and control system such as associated with the ITT digital television system, or by means of manually adjustable resistors, serve to separately adjust the signal gains of each driver stage, such as during alignment of the system, so that the kinescope properly reproduces a white image display in response to an input white image representative video signal. The white balance control voltages can also be developed as described in connection with an automatic white balance control system disclosed in U.S. Pat. No. 4,516,152 of D. H. Willis, titled "Video Signal Processor with Automatic Kinescope White Balance and Beam Current Limiter Control Systems."

Figure 2:
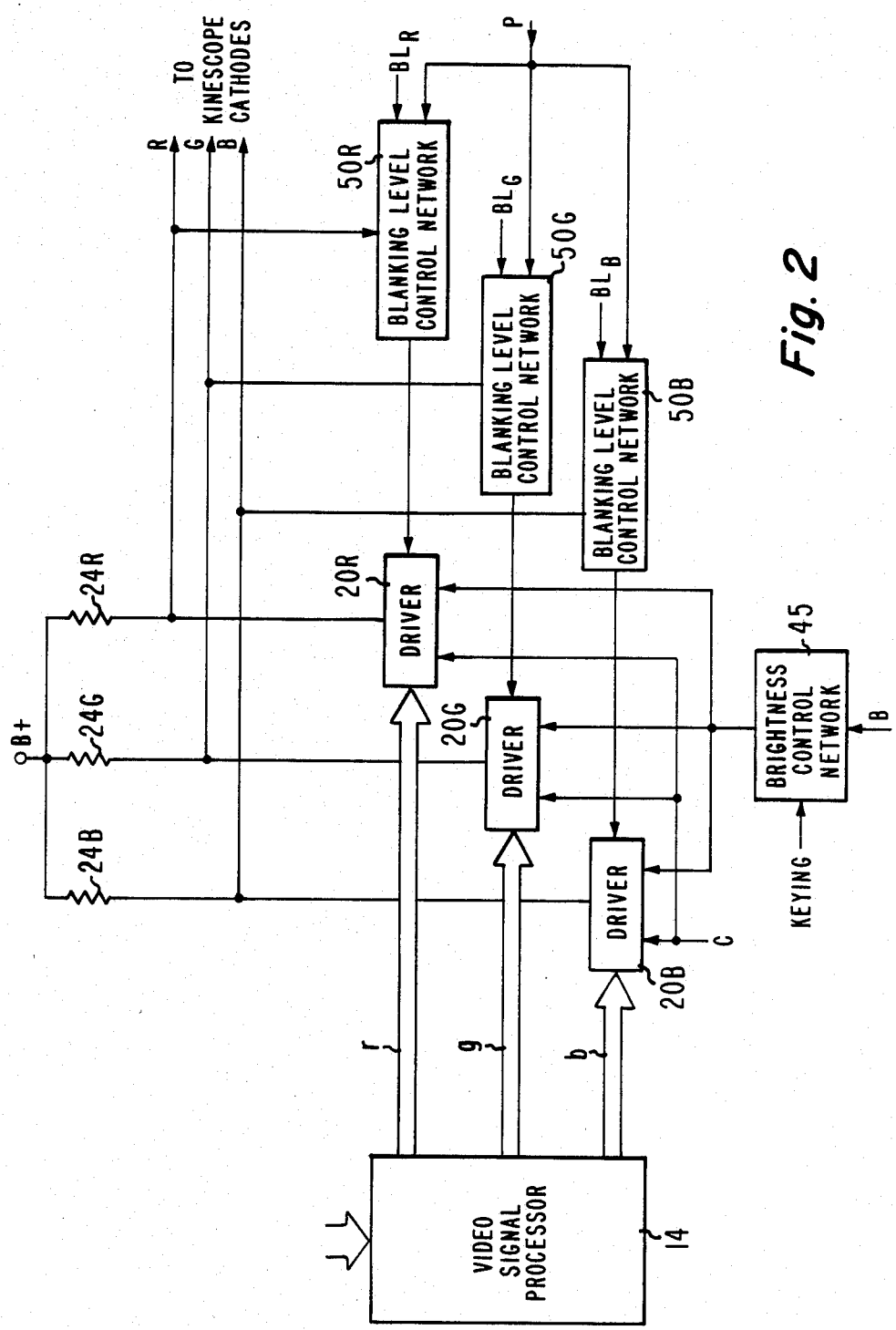
FIG. 2 illustrates a portion of a digital color television receiver with a brightness and contrast control arrangement in accordance with the present invention, as associated with plural color channels of the receiver.

FIG. 2 shows additional details of the system of FIG. 1 with regard to the plural red (R), green (G) and blue (B) signal processing channels. Elements common to FIGS. 1 and 2 are identified by similar reference numbers.

Digital video signals r, g and b from processor 14 are respectively applied to red, green and blue output driver stages 20R, 20G and 20B which have associated output load resistors 24R, 24G and 24B. The signal gains of drivers 24R, 24G and 24B and thereby the peak amplitudes of the associated color video signals are controlled concurrently in response to contrast control voltage C. The DC output level of the driver stages and thereby the brightness of a reproduced image are controlled concurrently in response to brightness control voltage B as coupled via network 45. The output bias levels of each driver stage are separately controlled by means of control networks 50R, 50G and 50B which operate as discussed with regard to FIG. 1.

Figure 3:
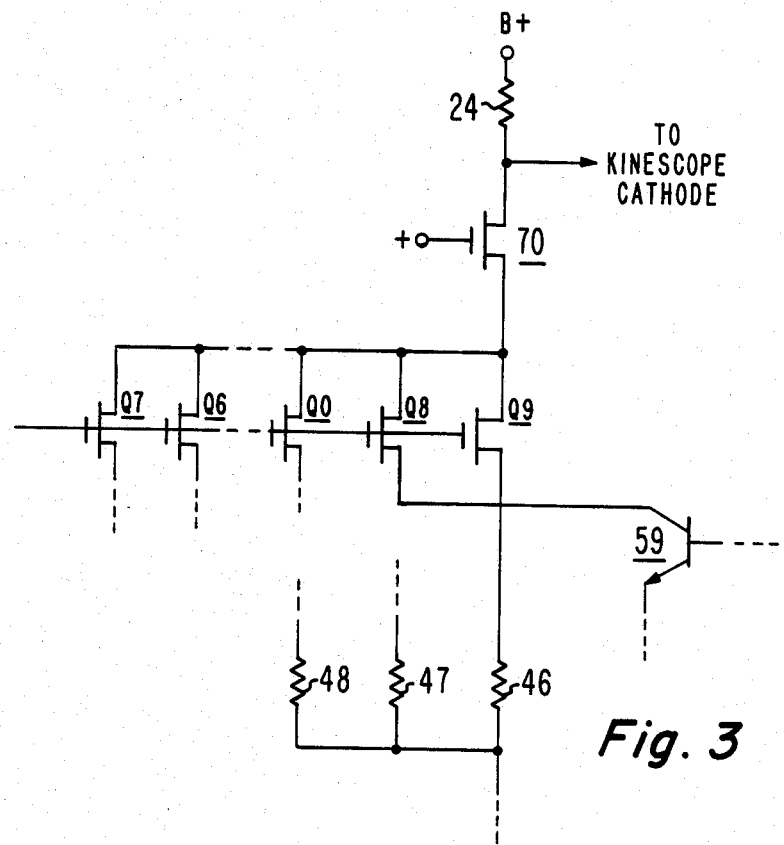
FIGS. 3 and 3a show details of alternate versions of a driver stage suitable for use with a brightness and contrast control arrangement in accordance with the invention.

FIG. 3 illustrates a modified version of the driver stage 20 as shown in FIG. 1, wherein corresponding elements are identified by the same reference number. In FIG. 3 resistor 46 is coupled to the source electrode of an additional FET transistor Q9, rather than to the source electrode of transistor Q8 as shown in FIG. 1. With this arrangement variations in the current conducted by transistor 59 advantageously do not influence the voltage developed across resistor 46 because the gate-source voltage of transistor Q9, which determines the source current of transistor Q9 and thereby the current in resistor 46, does not change as the conduction of transistor 59 varies. Also, a high voltage output transistor 70 forms a cascode output signal amplifier together with signal transistors Q0-Q7. With this cascode arrangement low voltage, low power devices can be used for transistors Q0-Q7 and Q8, Q9. Transistor 70 can be a MOSFET device as shown, or a bipolar device.

Figure 3A:
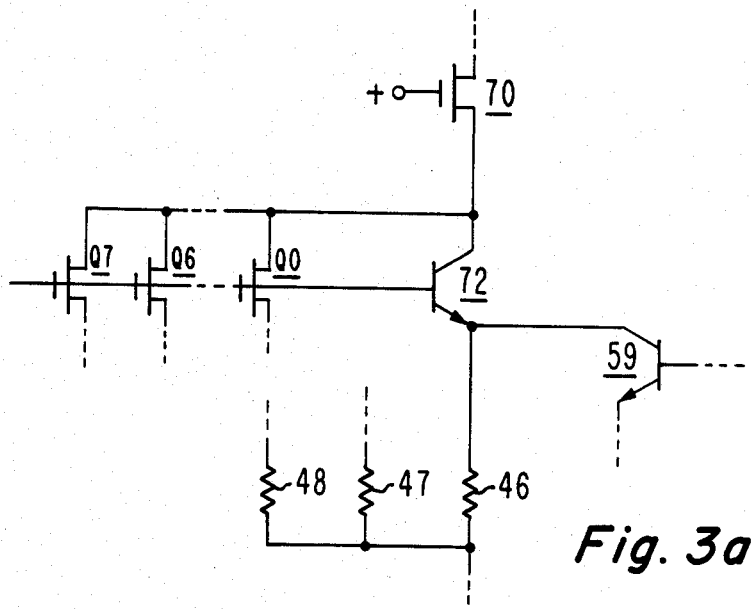

As shown in FIG. 3a, MOSFET transistors Q8 and Q9 of FIG. 3 can be replaced by a bipolar transistor 72. With this arrangement variations in the current conducted by transistor 59 have no significant influence on the voltage developed across resistor 46 because the current determining base-emitter junction voltage of transistor 72 remains substantially constant as the conduction of transistor 59 varies.

What is claimed is:

1. A digital video signal processing and display system comprising:
   a source of digital video signals comprising plural binary information bits representative of image information to be displayed;
   digital signal processor means for digitally processing said video signals;
   digital-to-analog signal converter means for providing an output analog signal version of digital output signals from said digital processor;
   image display means responsive to video signals applied to an intensity control electrode thereof;
   an analog video signal path for coupling said output analog video signals from said converter means to said intensity control electrode of said display means;
   means for providing viewer generated analog control signals for controlling the magnitude of said output analog video signals coupled to said display means; and
   means for coupling said control signals to said display means in analog form via a signal path exclusive of a signal path including said digital video signal processor; wherein
   said digital-to-analog signal converter means corresponds to a video output driver stage for providing to said intensity control electrode of said display means said analog signal version of digital output signals with a magnitude for directly driving said intensity control electrode, said digital-to-analog converter means having a plurality of inputs for receiving respective bits of said digital video signal for combining said bits so as to directly produce at an output said analog signal with a magnitude for directly driving said intensity control electrode; and
   said analog control signals are applied to said driver stage for controlling the magnitude of analog video signals coupled to said display means.

2. A system according to claim 1, wherein
   said providing means provides first and second control signals;
   said first control signal is coupled to said driver stage to control the gain thereof for varying the peak-to-peak amplitude of said analog video output signals from said driver stage; and
   said second control signal is coupled to said driver stage to control the DC output level thereof for varying the DC content of said analog video output signals from said driver stage.

3. A system according to claim 2, wherein
   said driver stage comprises an array of MOS transistor devices each having gate, drain and source electrodes;
   said gate electrodes are interconnected in common;
   said source electrodes receive respective ones of said information bits as input signals;
   said drain electrodes are connected in common to said intensity control electrode of said display means via said analog video signal path for providing said analog video output signals thereto;

a load impedance is coupled to said interconnected drain electrodes;

said first control signal is coupled to said interconnected gate electrodes; and said second control signal is coupled to said load impedance.

4. A system according to claim 2, and further comprising means for generating a third control signal for effecting white balance control of images displayed by said display means, said third control signal being coupled to said driver stage for controlling the peak-to-peak amplitude of said analog video output signals from said driver stage; and means for generating a fourth control signal for controlling the output bias of said driver stage, said fourth control signal being coupled to the output of said driver stage for maintaining a desired output DC bias level.

5. A system according to claim 3 and further comprising a further transistor device coupled between the output of said driver stage and said load impedance, and forming a cascode video signal amplifier with said array of transistor devices.

6. A digital video signal processing and display system comprising:

a source of digital video signals comprising plural binary information bits representative of image information to be displayed;

digital signal processor means for digitally processing said video signals;

digital-to-analog signal converter means for providing an output analog signal version of digital output signals from said digital processor;

image display means responsive to video signals applied to an intensity control electrode thereof;

an analog video signal path for coupling said output analog video signals from said converter means to said intensity control electrode of said display means; and means for providing a viewer generated analog contrast control signal for controlling the peak-to-peak amplitude of said output analog video signals coupled to said display means; wherein said converter means comprises an array of MOS transistor devices with gate electrodes interconnected in common for receiving said contrast control signal, with source electrodes for receiving respective ones of said information bits as input signals, and with drain electrodes connected in common to said intensity control electrode of said display means via said analog video signal path.

7. A digital video signal processing and display system comprising:

a source of digital video signals comprising plural binary information bits representative of image information to be displayed;

digital signal processor means for digitally processing said video signals;

digital-to-analog signal converter means for providing an output analog signal version of digital output signals from said digital processor;

image display means responsive to video signals applied to an intensity control electrode thereof;

an analog video signal path for coupling said output analog video signals from said converter means to said intensity control electrode of said display means; and means for providing an analog control signal for effecting white balance control of images displayed by said display means; wherein said converter means comprises an array of MOS transistor devices with gate electrodes interconnected in common for receiving said white balance control signal, with source electrodes for receiving respective ones of said information bits as input signals, and with drain electrodes connected in common to said intensity control electrode of said display means via said analog video signal path.

8. A digital video signal processing and display system comprising:

a source of digital video signals comprising plural binary information bits representative of image information to be displayed;

digital signal processor means for digitally processing said video signals;

digital-to-analog signal converter means for providing an output analog signal version of digital output signals from said digital processor;

image display means responsive to video signals applied to an intensity control electrode thereof;

an analog video signal path for coupling said output analog video signals from said converter means to said intensity control electrode of said display means; and means for providing a viewer generated analog brightness control signal for controlling the DC level of said output analog video signals coupled to said display means; wherein said converter means comprises an array of MOS transistor devices with gate electrodes interconnected in common, with source electrodes for receiving respective ones of said information bits as input signals, and with drain electrodes connected in common to said intensity control electrode of said display means and to a load impedance; and a further MOS transistor device has a gate electrode coupled to said commonly connected gate electrodes, a drain electrode coupled to said load impedance, and a source electrode for receiving said brightness control signal.

9. A system according to claim 8 and further comprising keyed bias control means with an input coupled to said analog video signal path for monitoring the black level of said output analog video signals from said converter means during video image blanking intervals for developing an output bias control signal at an output, said output bias control signal being coupled to said source electrode of said further transistor device.

* * * * *